United States Patent [19]
Purdham

[11] Patent Number: 5,970,253
[45] Date of Patent: Oct. 19, 1999

[54] PRIORITY LOGIC FOR SELECTING AND STACKING DATA

[75] Inventor: David M. Purdham, Brooklyn Park, Minn.

[73] Assignee: Unisys Corporation

[21] Appl. No.: 08/780,966

[22] Filed: Jan. 9, 1997

[51] Int. Cl.⁶ .................................................. G06F 13/14
[52] U.S. Cl. ..................... 395/732; 395/728; 395/729; 395/472; 370/85.1; 370/94.1
[58] Field of Search ................... 395/729, 728, 395/472, 732; 370/85.1, 94.1

[56] References Cited

U.S. PATENT DOCUMENTS

| | | | |
|---|---|---|---|
| 3,641,505 | 2/1972 | Artz et al. | 340/172.5 |
| 3,812,469 | 5/1974 | Hauck et al. | 340/172.5 |
| 3,872,447 | 3/1975 | Tessera et al. | 340/172.5 |
| 3,921,150 | 11/1975 | Scheuneman . | |
| 3,925,766 | 12/1975 | Bardotti et al. | 340/172.5 |
| 4,056,844 | 11/1977 | Izumi | 364/200 |
| 4,070,704 | 1/1978 | Calle et al. | 364/200 |
| 4,070,706 | 1/1978 | Scheuneman | 364/200 |
| 4,130,865 | 12/1978 | Heart et al. | 364/200 |
| 4,245,306 | 1/1981 | Besemer et al. | 364/200 |
| 4,309,754 | 1/1982 | Dinwiddle, Jr. | 364/200 |
| 4,349,871 | 9/1982 | Lary | 364/200 |
| 4,400,771 | 8/1983 | Suzuki et al. | 364/200 |
| 4,426,681 | 1/1984 | Bacot et al. | 364/200 |
| 4,437,157 | 3/1984 | Witalka et al. | 364/200 |
| 4,442,487 | 4/1984 | Fletcher et al. | 364/200 |
| 4,481,572 | 11/1984 | Ochsner | 364/200 |
| 4,525,777 | 6/1985 | Webster et al. | 364/200 |
| 4,595,911 | 6/1986 | Kregness et al. | 340/347 DD |
| 4,598,362 | 7/1986 | Kinjo et al. | 364/200 |
| 4,667,288 | 5/1987 | Keeley et al. | 364/200 |
| 4,716,527 | 12/1987 | Graciotti | 364/200 |
| 4,722,072 | 1/1988 | Price | 364/900 |
| 4,755,930 | 7/1988 | Wilson, Jr. et al. | 364/200 |
| 4,761,755 | 8/1988 | Ardini, Jr. et al. | 364/749 |
| 4,794,521 | 12/1988 | Ziegler et al. | 364/200 |
| 4,807,110 | 2/1989 | Pomerene et al. | 364/200 |
| 4,807,183 | 2/1989 | Kung et al. | 364/900 |
| 4,829,467 | 5/1989 | Ogata | 364/900 |
| 4,843,541 | 6/1989 | Bean et al. | 364/200 |
| 4,843,542 | 6/1989 | Dashiell et al. | 364/200 |
| 4,860,192 | 8/1989 | Sachs et al. | 364/200 |
| 4,860,198 | 8/1989 | Takenaka | 364/200 |
| 4,868,818 | 9/1989 | Madan et al. | 371/11.3 |
| 4,878,166 | 10/1989 | Johnson et al. | 364/200 |
| 4,888,771 | 12/1989 | Benignus et al. | 371/16.1 |
| 4,891,810 | 1/1990 | de Corlieu et al. | 371/9.1 |
| 4,933,901 | 6/1990 | Tai et al. | 365/189.07 |

(List continued on next page.)

OTHER PUBLICATIONS

Wilson, Jr., "Hierarchical Cache/Bus Architecture for Shared Memory Multiprocessors", IEEE, 1987.

*Primary Examiner*—Glenn A. Auve
*Assistant Examiner*—Frantz Blanchard Jean
*Attorney, Agent, or Firm*—Charles A. Johnson; Mark T. Starr; Nawrocki, Rooney & Sivertson, P.A.

[57] ABSTRACT

A method and apparatus for setting a priority sequence among a plurality of requesters using a common destination within a computer system. An advantage is that all requesters contending for the common destination will have timely access with respect to all other competing requesters. In a first exemplary embodiment of the present invention, a priority controller can use a two-level priority scheme to select the next requester. The first level of priority alternates between an external requester and an on-card requester where every other set of data is from the external requester. The second level of priority alternates between on-card modules during an on-card priority cycle. In an alternative exemplary embodiment, the priority controller can stack a request to transfer acknowledge and data information from an external requester if it is busy. The priority controller also prevents sending an acknowledgment/data cycle out to an external source to prevent sending more data than the FIFO stacks can accommodate. The data may also consist only of acknowledgements.

31 Claims, 5 Drawing Sheets

U.S. PATENT DOCUMENTS

| | | | |
|---|---|---|---|
| 4,956,820 | 9/1990 | Hashimoto | 365/222 |
| 4,959,782 | 9/1990 | Tulpule et al. | 364/200 |
| 4,979,107 | 12/1990 | Advani et al. | 364/200 |
| 4,992,930 | 2/1991 | Gilfeather et al. | 364/200 |
| 4,995,035 | 2/1991 | Cole et al. | 370/95.2 |
| 5,014,197 | 5/1991 | Wolf | 364/200 |
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,043,981 | 8/1991 | Firoozmand et al. | 370/85.1 |
| 5,051,946 | 9/1991 | Cubranich et al. | 364/900 |
| 5,058,006 | 10/1991 | Durdan et al. | 364/200 |
| 5,068,782 | 11/1991 | Scheuneman et al. | |
| 5,084,871 | 1/1992 | Carn et al. | 370/94.1 |
| 5,113,522 | 5/1992 | Dinwiddie, Jr. et al. | 395/700 |
| 5,115,507 | 5/1992 | Callemyn | 395/725 |
| 5,125,081 | 6/1992 | Chiba | 395/325 |
| 5,129,077 | 7/1992 | Hillis | 395/500 |
| 5,140,682 | 8/1992 | Okura et al. | 395/425 |
| 5,148,533 | 9/1992 | Joyce et al. | 395/425 |
| 5,165,018 | 11/1992 | Simor | 395/300 |
| 5,168,570 | 12/1992 | Eckert et al. | 395/725 |
| 5,170,472 | 12/1992 | Cwiakala et al. | 395/275 |
| 5,175,824 | 12/1992 | Soderbery et al. | 395/325 |
| 5,179,705 | 1/1993 | Kent | 395/725 |
| 5,193,163 | 3/1993 | Sanders et al. | 395/425 |
| 5,195,185 | 3/1993 | Marenin | 395/325 |
| 5,202,966 | 4/1993 | Woodson | 395/325 |
| 5,218,688 | 6/1993 | Nishida | 395/425 |
| 5,255,374 | 10/1993 | Aldereguia et al. | 395/325 |
| 5,255,375 | 10/1993 | Crook et al. | 395/325 |
| 5,255,378 | 10/1993 | Crawford et al. | 395/325 |
| 5,265,257 | 11/1993 | Simcoe et al. | 395/725 |
| 5,280,474 | 1/1994 | Nickolls et al. | 370/60 |
| 5,303,382 | 4/1994 | Buch et al. | 395/725 |
| 5,313,602 | 5/1994 | Nakamura | 395/425 |
| 5,367,654 | 11/1994 | Furakawa et al. | 395/425 |
| 5,375,220 | 12/1994 | Ishikawa | 395/425 |
| 5,388,227 | 2/1995 | McFarland | 395/325 |
| 5,444,847 | 8/1995 | Iitsuka | 395/287 |
| 5,452,239 | 9/1995 | Dai et al. | 364/578 |
| 5,471,592 | 11/1995 | Gove et al. | 395/300.03 |
| 5,559,969 | 9/1996 | Jennings | 395/307 |
| 5,603,005 | 2/1997 | Bauman et al. | 395/451 |
| 5,623,672 | 4/1997 | Popat | 395/728 |
| 5,630,077 | 5/1997 | Krein et al. | 395/293 |
| 5,634,060 | 5/1997 | Jennings | 395/729 |
| 5,649,206 | 7/1997 | Allen | 395/729 |
| 5,659,707 | 8/1997 | Wang et al. | 395/472 |

PRIORITY LOGIC FOR SELECTING AND STACKING DATA

CROSS REFERENCE TO CO-PENDING APPLICATION

This application is related to co-pending U.S. patent application Ser. No. 08/780,965, filed Jan. 9, 1997, entitled "High Speed Point-to-point Memory Interface", which is assigned to the assignee of the present invention and is incorporated herein by reference.

BACKGROUND OF THE INVENTION

1. Field of the Invention

This invention relates to logic which responds to data in a predetermined priority. More specifically, this invention relates to logic for a priority controller with more than one category of requesters which has a different response to each.

2. Description of the Prior Art

The increase in logic density provided by increasing chip density has resulted in a relatively limited number of pins being available for subsystem communication. This problem has been addressed by using a single communication channel between subsystems. The use of a single communication channel for system communication, while reducing the number of pins required for communication, results in competition between the subsystems for access to the single communication channel. This requires a priority scheme to arbitrate access to the single communication channel between the various subsystems.

A common priority scheme for a single communication channel having a number of requesters is a first-in first-out (FIFO) arrangement. In a FIFO arrangement the priority scheme merely responds to the requesters in the order of their request for channel use. When two requesters request priority simultaneously this results in a priority problem.

Another common priority scheme uses different levels of priority for each requester from a highest level to successively lower level for all of the requesters in use. Under this arrangement access to the channel is granted to the requester having the highest level priority. Here, when two requesters request channel use, the requester with the lowest priority is forced to wait until the higher level priority requester is finished. While this solves a simultaneous request problem, under some conditions this can result in a lower level priority requester being locked out, i.e., never being granted access, because there is always the possibility that a higher priority requester may always interrupt a request of the lower level priority requester before the lower level request can be acted upon.

Another common priority scheme uses a "snapshot" priority arrangement. The request status of all current requesters at an instant of time is called a "snapshot" of the current requester status. A snapshot scheme also uses different levels of priorities for each requester, as above, but instead of permitting later requests to preempt a current lower level requester, all requests noted in a snapshot are honored before any later requests are acted upon. Only after all of the requests in the current snapshot have been responded to is a later snapshot taken. This ensures that no low level requester can be locked out of the system.

A representative single channel communication application is using a single communication channel to interconnect a number of third level main memory cards with second level cache cards. This results in data being sent over the single channel being routed through intermediate memory cards to a selected second level cache card. Here, whenever the communication channel is free, the data can be sent immediately to the next memory card, however, when the channel is busy, data received by the intermediate memory card must be stored on the card until the channel is again free.

The FIFO system, described above, is not suitable for this cache problem because of the possibility of simultaneous requests, since the data is typically asynchronous. The prioritized scheme, described above, could handle simultaneous requests, but could lock-out data if higher priority requests always occurred before any lower priority requests could be serviced. If the FIFO scheme were combined with the priority scheme, the lock-out problem would be solved, but lower priority requests would be serviced infrequently which could degrade system performance. The snapshot priority scheme also solves a lock-out problem, but still does not solve the problem of providing priorities which will transmit data efficiently to a destination channel from a remote memory card and a local memory card to a destination card over a single communication channel.

A desirable priority scheme for a system which transfers data over a single channel from a source memory card through intermediate memory cards to a destination card is one that provides equal priority to the transmission of data from an external memory card to the transmission of data located on the memory card itself. When two memory banks are provided on the memory card for data, this would require twice the access for remote data to the single communication channel. This would ensure that the transmission of data from a remote card over a single communication channel would not be delayed excessively.

SUMMARY OF THE INVENTION

This apparatus provides priority logic in a computer storage system for sending data and acknowledgement of data transfers through a number of main memory cards to a second level cache memory card over a single communication channel. In this storage system, both acknowledgements and data from memory on one card is passed to memory on an adjacent main memory card over a single channel until the data is delivered to the destination card containing the cache memory. This requires that logic on a memory card must be capable of receiving data from a more remote memory card, and sending the data onward toward the cache card. The apparatus provided here is arranged to transmit the data through a memory card onward to the second level cache memory card immediately if the communication channel is free, and otherwise to store the data on the memory card until the channel is available.

In this system, a data word can have any number of bits depending upon the memory in use in the system. A data set usually consists of data and acknowledgement, although a data set can consist of acknowledgements only. The data may consist of eight data words. Each word may consist of 18 bits of data and two flags. The acknowledgement may be a six-bit binary code which identifies the data set.

When transmitting each data set, the acknowledgement six-bit binary code is transmitted a fixed time before the data is transmitted. In order to identify the source of the data set, the acknowledgement contains coded information which is provided to the receiving card to indicate that a particular data set has been sent.

The description of the interconnection apparatus, the addressing schemes, and the transfer of data and acknowledgements between cards is described in detail in the "High Speed Point-to-Point Memory Interface" application assigned to the same assignee as the present invention, and incorporated herein by reference.

The present invention provides apparatus for receiving data sets and acknowledgements at intermediate memory cards from memory cards more remote to the destination second level cache memory card, and either retransmitting the data sets and acknowledgements if the communication channel is free, or storing the data sets and acknowledgements whenever the communication channel is busy, until the channel is free. In this apparatus, each memory card has two internal memory banks for storing data sets, a B0 bank and a B1 bank. First-in first-out (FIFO) stacks are provided for temporary storage of data sets received from remote cards for storing a number of data sets before retransmission whenever the communication channel is not available for immediate transmission.

Priority logic on each card is arranged to give access to the communication channel to data from an external memory card equal to that of the data from the on-card memory banks. This is accomplished by giving data from external memory cards and data from on-card memory banks alternate opportunities to provide data to the single communication channel. Each memory transfer usually consists of an acknowledgement followed by a fixed time, later by data, which together constitute, a data set. A data set may however consist only of acknowledgments.

Using the priority scheme of this invention, expressed in priority logic, if both an on-card and an external card are trying to provide data to the single communication channel, out of every four successive data cycles, two data transfers will be data from the on-card memory, and two data transfers will be data from an external memory card. This scheme provides the most efficient means for data from a memory card most remote from the second level cache memory card to be transferred expeditiously through intermediate memory cards to the second level cache memory card destination, because neither stored or incoming data is excessively delayed.

When the communication channel is idle, any request from either the on-card data banks or external memory card data banks is serviced immediately. If the request is from an on-card memory bank, the acknowledge codes and data will be read out of either one of the two memory stacks and sent out on the free communication channel. If the request is from an external memory card, the data set will flow through the priority logic from the requester card directly through the communication channel.

If the communication channel is busy when a request to transfer data is received, the priority logic will respond differently depending on the request source. For on-card memory bank requests, the logic will simply wait until the end of the current request to handle the new request. For external memory card requests, the acknowledge codes and data of the data set will be stored in their respective FIFO stacks for later retransmission in the order received.

The priority scheme used to provide priorities between on-card data and external card data uses a first and second level alternating source scheme. During continuous requests from an external card and from on-card memory banks, the first level of priority will, alternate the communication channel availability between external card requests and on-card requests. This results in alternate data sets transmitted by the channel being from the external memory card and from the on-card memory bank. If requests are discontinuous, the priority logic will fill in any time gap in requests with requests that are waiting.

The second level of priority causes the channel to alternate between the two on-card memory banks during successive on-card priorities. This will result in the sequence of priorities for on-card data being the B0 memory bank and the B1 memory bank for successive on-card data transfers. These first and second priority schemes result in the following sequence of priorities: B0, Ext, B1, Ext, B1, Ext . . . , where B0 is data from on-card memory bank B0, B1 is data from on-card memory bank B1, and Ext is either external data from the input lines, or external data stored in a FIFO stack in the embodiment which provides a FIFO stack. Transferring a data set from one card to another takes a given known period of time.

The priority logic uses a separate signaling mechanism to ensure that a data set is only sent to a receiving card that can successfully receive the data set. In one mode of operation, this is accomplished by transmitting only two data sets to the receiving card and then waiting until receiving a read acknowledge signal indicating that a previously sent data set has been accepted. When the previously sent data set has been accepted, another data set can be sent out. Operating in this manner, there will never be more than two data sets sent out without the receipt of an accepting read acknowledge signal from the receiver.

A second operator selectable mode of operation only sends one data set before waiting for the accepting read acknowledge signal to be returned. Other than the resulting time differences, since a data set time interval must occur before the first accepting read acknowledge signal is received, the subsequent operation of the two modes will be the same.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Detailed embodiments of the present invention are disclosed herein. It is to be understood, however, that the disclosed embodiments are merely exemplary of the present invention which may be embodied in various forms. Therefore, specific details disclosed herein are not to be interpreted as limiting, but rather as a basis for the claims and as a representative basis for teaching one of skill in the art to practice the invention.

Figure 1:
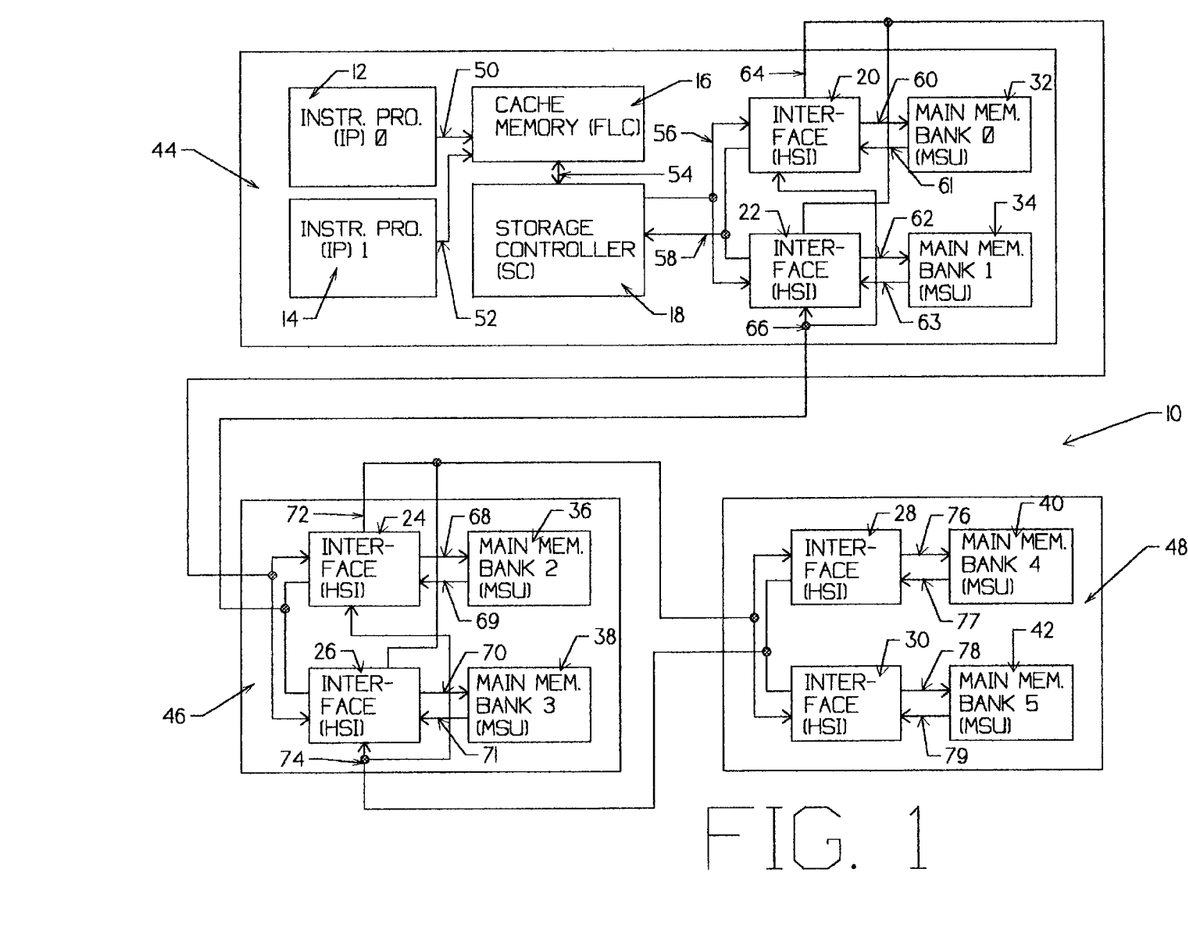
FIG. 1 shows a block diagram of an overall system of interconnected main memory cards, instruction processors, storage controllers and cache memory.

Referring now to FIG. 1, a block diagram of an overall system 10 is shown comprising instruction processors (IP) 0 and 1 in blocks 12 and 14, respectively, first level cache memory (FLC) block 16, storage controller (SC) block 18, high speed interface (HSI) in blocks 20, 22, 24, 26, 28 and 30, and main storage units (MSU) 0, 1, 2, 3, 4, and 5 in blocks 32, 34, 36, 38, 40 and 42, respectively. This represents one power domain of a two power domain system utilizing two such systems with interconnections between SC 18 of each power domain.

A processor, controller, cache memory and main memory storage unit card 44 mounts blocks 12, 14, 16, 18, 20, 22, 32 and 34. Main memory unit and interface cards 46 and 48 mount blocks 24, 26, 36 and 38, and blocks 28, 30, 40 and 42, respectively.

IP 0 block 12 and IP 1 block 14 are connected to FLC block 16 by lines 50 and 52 respectively. FLC block 16 is connected to SC block 18 by line 54. SC block 18 is connected to HSI blocks 20 and 22 by lines 56 and 58. HSI blocks 20 and 22 are connected to MSU 0 block 32, and MSU 1 block 34 by lines 60 and 61, and by lines 62 and 63, respectively. These interconnections on card 44 permits HSI blocks 20 and 22 to exchange data sets between MSU 0 and 1, blocks 32 and 34, SC block 18 and FLC block 16.

HSI blocks 20 and 22 have lines 64 and 66 coupled to HSI blocks 24 and 26. HSI block 24 has lines 68 and 69 coupled to MSU 2 block 36, and HSI block 26 has lines 70 and 71 coupled to MSU 3 block 38. Lines 64 and 66 from HSI 20 and 22 on card 44 transfer data sets between cards 44 and 46. Lines 68 and 69 and lines 70 and 71 transfer data sets between HSI block 24 and MSU 2 block 36, and between HSI block 26 and MSU 3 block 38, respectively.

HSI blocks 24 and 26 have lines 72 and 74 coupled to HSI blocks 28 and 30. HSI block 28 has lines 76 and 77 coupled to MSU 4 block 40, and HSI block 30 has lines 78 and 79 coupled to MSU 5 block 42. Lines 72 and 74 transfer data sets between HSI blocks 24 and 26 and HSI blocks 28 and 30. Lines 76 and 77 and lines 78 and 79 transfer data sets between HSI block 28 and MSU 4 block 40, and between HSI block 30 and MSU 5 block 42, respectively.

This apparatus is arranged to permit transferring data sets in opposite directions simultaneously between card 48 and card 46 or between card 46 and card 44. This arrangement reflects the limitation of pins available for data transfer. The priority logic in the present invention is only needed for the transfer of data from card 48 to 46 and from card 46 to 44.

Figure 2:
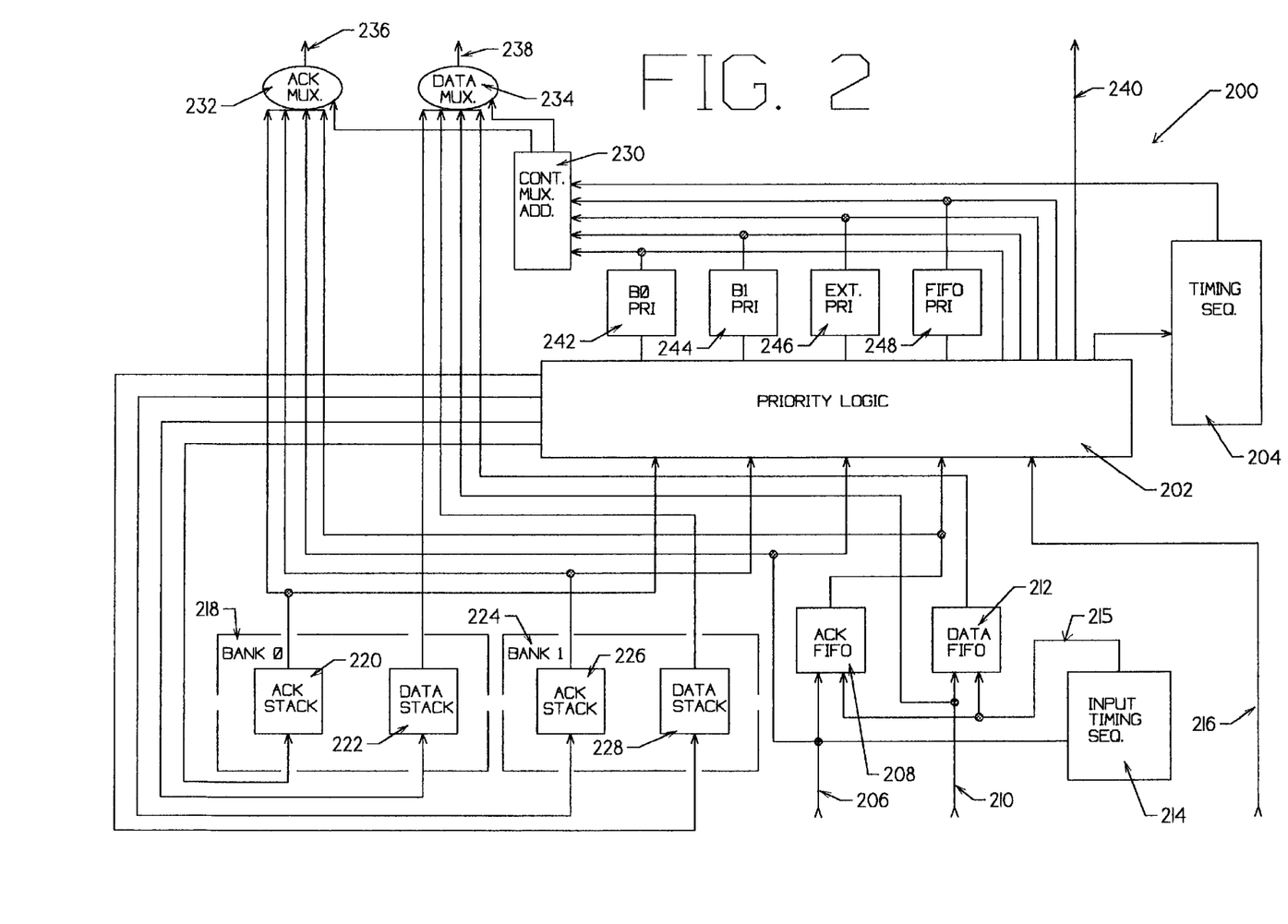
FIG. 2 shows a block diagram of a high speed interface controller providing priority logic for data and acknowledge storage and transfer.

In FIG. 2 a block diagram 200 for each HSI blocks 20, 22, 24, 26, 28 and 30 is shown. Priority logic block 202 incorporates logic functions for first and second level priorities, data set storage control, and data set transfer. Timing sequence block 204 provides the necessary timing signals for priority logic block 202.

If the communication lines are busy at the time of an external data set arrival, the acknowledge portion of the data set from an external card received over lines 206 is stacked in acknowledge FIFO (ACK FIFO) block 208. At a later time, the data portion of the data set is received over lines 210 is stored in stacked data FIFO (DATA FIFO) block 212. Blocks 208 and 212 have their timing sequences provided by input timing sequence block 214 via path 215.

Data acceptance signaling input signal line 216 provides an input signal which is returned from a receiving card to priority logic block 202 to acknowledge that data has been accepted, and that the card is ready for more data.

Memory bank 0 block 218 contains two memory stacks, acknowledge (ACK) stack block 220 and data stack block 222. Memory bank 1 block 224 contains two memory stacks, ACK stack block 226 and data stack block 228. Blocks 220, 222, 226 and 228 are memory stacks which store their information in the stack in the order received from the main storage (not shown) and are read in the order received.

Control multiplexer address block 230 is a multiplexer controller which provides address control for acknowledge multiplexer (ACK MUX) block 232 and data MUX block 234. Data sets are provided to external cards with acknowledgements from block 232 on acknowledge line 236 and data from block 234 on data line 238. Data acceptance signals are provided to external cards on output lines 240. Lines 236 and 238 correspond to line 58 of FIG. 1. Line 240 corresponds to line 64 of FIG. 1. Lines 206 and 210 correspond to line 66 of FIG. 1. Finally, line 216 corresponds to line 56 of FIG. 1.

Priority for the multiplexer addresses are provided by B0 priority (PRI) block 242, B1 PRI block 244, external priority (EXT PRI) block 246, and, FIFO PRI block 248. Whenever any of these blocks are set by priority logic block 202 then control multiplexer address 230 will direct the selected stored quantities from memory bank B0 block 218, memory bank B1 block 224, external data lines 206 and 210, or from FIFO blocks 208 and 212, ACK MUX block 232 and data MUX 234 for transmission over lines 236 and 238, respectively.

Thus, if the communication lines 236 and 238 are busy when a data set is received on lines 206 and 210, the data will be stored by priority logic 202 in FIFO blocks 208 and 212. If lines 236 and 238 are not busy, when priority is given to the external data set as described later, EXT PRI block 246 will be set, the data set will be transferred directly to multiplexers 232 and 234, and the data set immediately sent out on communication lines 236 and 238.

Priority logic block 202 also provides the first and second level priority scheme described earlier, having a first level priority scheme which alternates channel priorities between external memory data received over lines 206 and 210, and internal memory data stored in blocks 218 and 224. The second level priority scheme alternates the alternate internal data priorities between bank 0 block 218 and bank 1 block 224. This will alternate priority between bank 0 block 218, external memory data, bank 1 block 224, external memory data, which is repeated ad infinitum. When external memory has priority, the data will be obtained from the FIFO blocks 208 and 212, if there is data stored in those blocks. If there is no external memory data in the FIFO blocks 208 and 212 at that time, data will be obtained from lines 206 and 210, if there is external memory data being received. If lines 236 and 238 are not available and external data is being received on lines 206 and 210, that data will be stored in FIFO blocks 208 and 212, respectively.

When priority is given for any of the above sources but no data is available from the source having priority, then logic block 202 will give priority to the next source which does have data available. Specifically, if there is no external data available, the priority will be given to an on-card bank, and vice versa. Also, if one of the banks does not have data available during its priority window, the other bank will be given priority if it has data available.

As described earlier, a data set consists of data and acknowledgement. The data may consist of eight data words. Each word may consist of 18 bits of data and two flag bits. The acknowledgement may be a six-bit binary code to identify that particular data set.

At the beginning of any new data set transmission, priority logic block 202 will initially send only two such data sets over lines 236 and 238 to a receiving card before receiving an acceptance signal back on line 216, and only after receiving an acceptance receipt back from the receiving card will any subsequent data sets be sent. After the initial two data set transmissions and an acceptance receipt, an additional data set will be transmitted each time a subsequent acceptance for that particular transmission is received back from the receiving card.

Figure 3A:
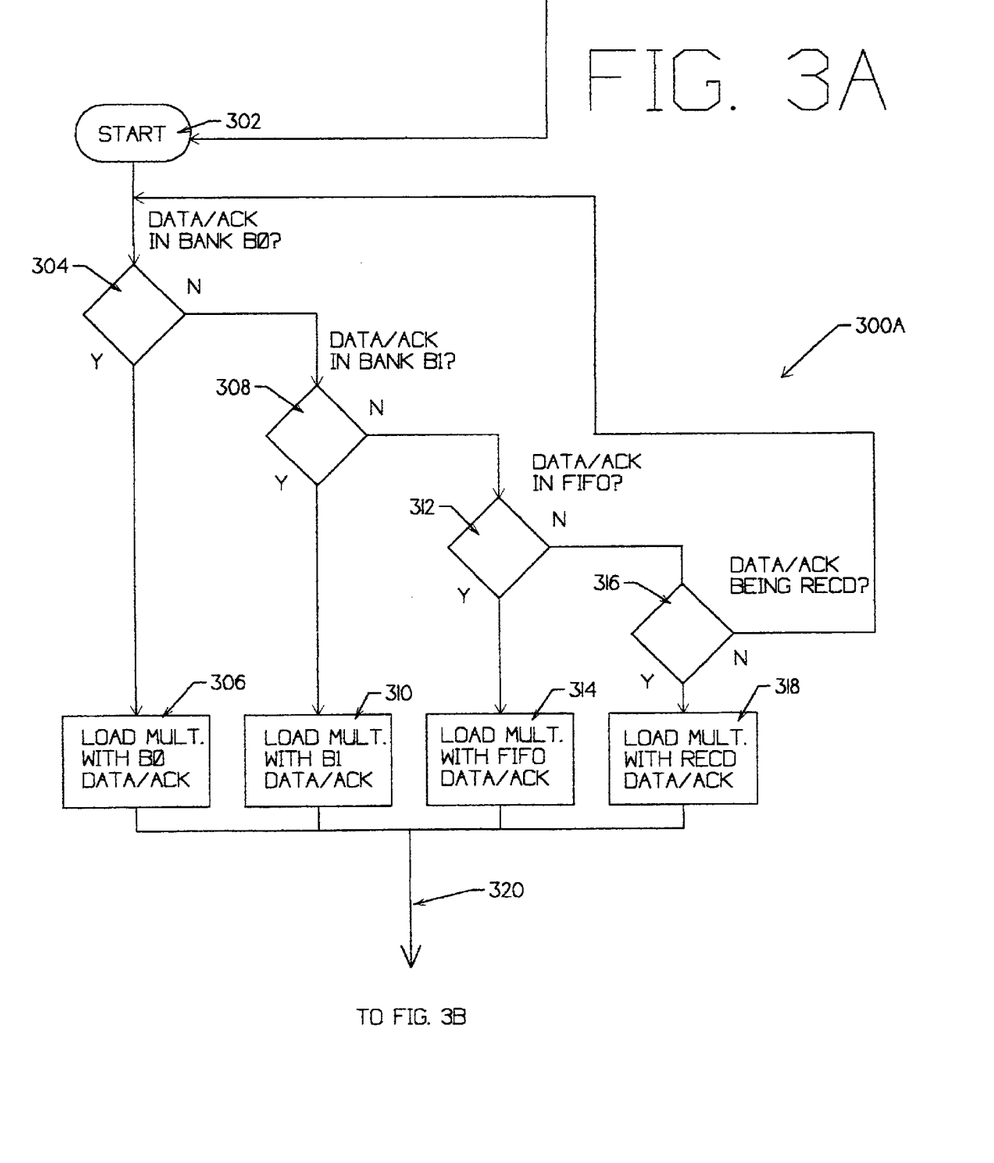
FIG. 3A shows a portion of the logic diagram for the high speed interface controller.
Figure 3B:
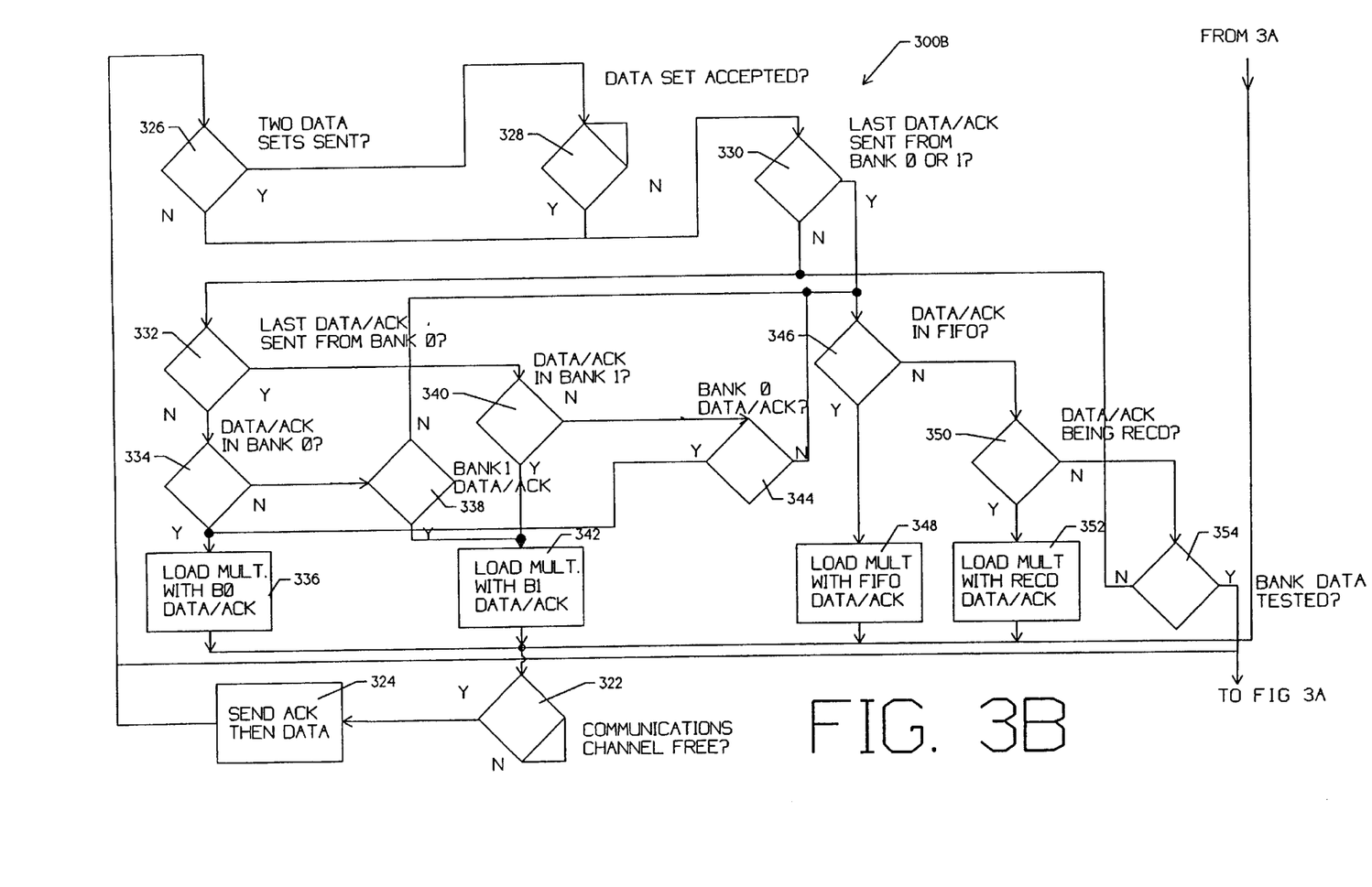
FIG. 3B shows the remaining portion of the logic diagram for the high speed interface controller.

FIGS. 3A and 3B show logic flow chart diagrams 300A and 300B which show the operation of the high speed interface for the blocks shown in FIG. 2. The program is entered at Start block 302 and transferred to Data/Ack in Bank B0? test block 304 which determines if any data and acknowledge words are present in memory bank 0 block 218. If any words are present control is passed to Load Multiplexers with B0 Data/Ack block 306 which loads multiplexer blocks 232 and 234, respectively, with acknowledgement and data words from block 218.

If no words are present in memory bank B0 then control is passed to Data/Ack in Bank B1? test block 308 which determines if any data and acknowledge words are present in memory bank 1 block 224. If any words are present, control is passed to Load Multiplexers with B1 Data/Ack block 310 which loads multiplexer blocks 232 and 234, respectively, with acknowledgement and data words from block 224.

If no words are present in memory bank B1 block 224 then control is passed to Data/Ack In FIFO? test block 312 which determines if any data and acknowledge words are present in FIFO blocks 212 and 208, respectively. If any words are present, control is passed to Load Multiplexers with FIFO Data/Ack block 314 which loads multiplexer blocks 232 and 234, respectively, with the oldest FIFO acknowledgement and data words in blocks 212 and 208, respectively.

If no acknowledge and data words are present in the FIFO, control is passed to Data/Ack Being Recd? block 316 which determines if any data and acknowledge words are being received on lines 210 and 206, respectively. If any words are being received at that time, they are passed through to Load Multiplexers with Recd Data/Ack block 318 which loads multiplexer blocks 232 and 234, respectively, with the acknowledgement and data words then being received. If no words are being received at that time, control is passed to block 304.

The result of the operation of the logic of FIG. 3A is that acknowledgment and data words will always be loaded into multiplexer blocks 232 and 234 before the program will be exited at line 320. Line 320 continues in FIG. 3B to Communications Channel Free? test block 322.

If block 322 determines that the communications channel is not free, the program will wait until it is free and then control will be passed to Send Ack Then Data block 324. Block 324 will send the acknowledge word in multiplexer block 232 over line 236 followed by a predetermined time later by the data word from multiplexer block 234 over line 238.

Control is then passed to Two Data Sets Sent? test block 326. Block 326 determines whether two data sets have been sent out without receipt of acceptance signals. If two data sets have been sent without acceptance, control passes to Data Set Accepted? test block 328, and waits until a data set is accepted. Upon receipt of the acceptance signal, control is passed to Last Data/Ack Sent from Bank 0 or 1? block 330.

If the test in block 326 indicated that there was not two outstanding data sets, control is passed directly to block 330. Blocks 326 and 328 together permit the first two data sets to be transmitted through unimpeded, but requires subsequent data sets to wait for an acceptance signal until control is passed to block 330.

Block 330 will determine if the last data and acknowledge word was from bank 0 or 1 for block 218 or 224, respectively. If the last data and acknowledge word was not from either of these banks, then control is passed to Last Data/Ack Sent from Bank 0? test block 332. If the last data was not sent from bank 0 block 218, then control is passed to Data/Ack in Bank 0? block 334. If block 334 determines that there are Data/Acknowledgement words in bank 0 block 218, then control is passed to Load Mult with B0 Data/Ack block 336. Block 336 loads the acknowledgement word in block 220 into multiplexer block 232 and the data word in block 222 into multiplexer block 234. Control is then passed from block 336 to block 322.

If block 334 finds no words in block 218, then control is passed to Bank 1 Data/Ack? block 338 which will pass control to Load Mult with B1 Data/Ack block 342 if bank 1 block 224 has data acknowledgement words available. Block 342 loads the acknowledgement word in block 226 into multiplexer block 232, and the data word in block 228 into multiplexer block 234. Control is then passed from block 342 to block 322. If block 338 finds no words in block 224, then control is passed to Data/Ack in FIFO? block 346.

If block 332 determines that the last information was sent from bank 0 block 218, then control is passed to Data/Ack in Bank 1? block 340. Block 340 determines whether block 224 contains data and, if it does, control is passed to Load Mult with B1 Data/Ack block 342. Block 342 loads the acknowledgement word in block 226 into multiplexer block 232, and the data word in block 228 into multiplexer block 234. Control is then passed from block 342 to block 322.

If block 340 finds no words in block 224, then control is passed to Bank 0 Data/Ack? block 344 which will pass control to Load Mult with B0 Data/Ack block 336 if bank 0 block 218 has data acknowledgement words available. Block 336 loads the acknowledgement word in block 220 into multiplexer block 232, and the data word in block 222 into multiplexer block 234. Control is then passed from block 336 to block 322. If block 344 finds no words in block 218, then control is passed to Data/Ack in FIFO? block 346.

If block 330 finds that the last information was sent from bank 0 or 1 blocks 218 and 224, respectively, then control is sent to Data/Ack in FIFO? block 346 which determines if information is present in FIFO blocks 208 and 212. If data is present, then Load Mult with FIFO Data/Ack block 348 is entered which loads the oldest data in FIFO block 208 into multiplexer block 232, and the oldest data in FIFO block 212 into multiplexer block 234. Control is then passed from block 348 to 322.

If no information is present in the Data FIFO block 212 and the Ack FIFO block 208, control is passed from block 346 to Data/Ack being Received? test block 350. Block 350 determines if data is being received over lines 206 and 210, and when there is data being received, control is passed to Load Mult with Recd Data/Ack block 352. Block 352 will load the information being received over lines 206 directly into multiplexer block 232, and the information being received over lines 210 directly into multiplexer block 234. Control is then passed from block 352 to block 322.

If block 350 indicates no data being received, then control is passed to Bank Data Tested? block 354. If the banks have not already been tested for available data sets, control is passed to Last Data/Ack Sent from Bank 0? block 332. Otherwise control is sent to the Start Block 302 to loop through the sequence again.

The results of the logic of FIG. 3B provides a protocol which alternates word transfers between external and internal data sources, and alternates internal word transfers between memory banks 0 and 1. In addition, the first two data sets will be transferred without waiting for an acceptance signal while succeeding data sets will be delayed until an acceptance is returned.

Figure 4:
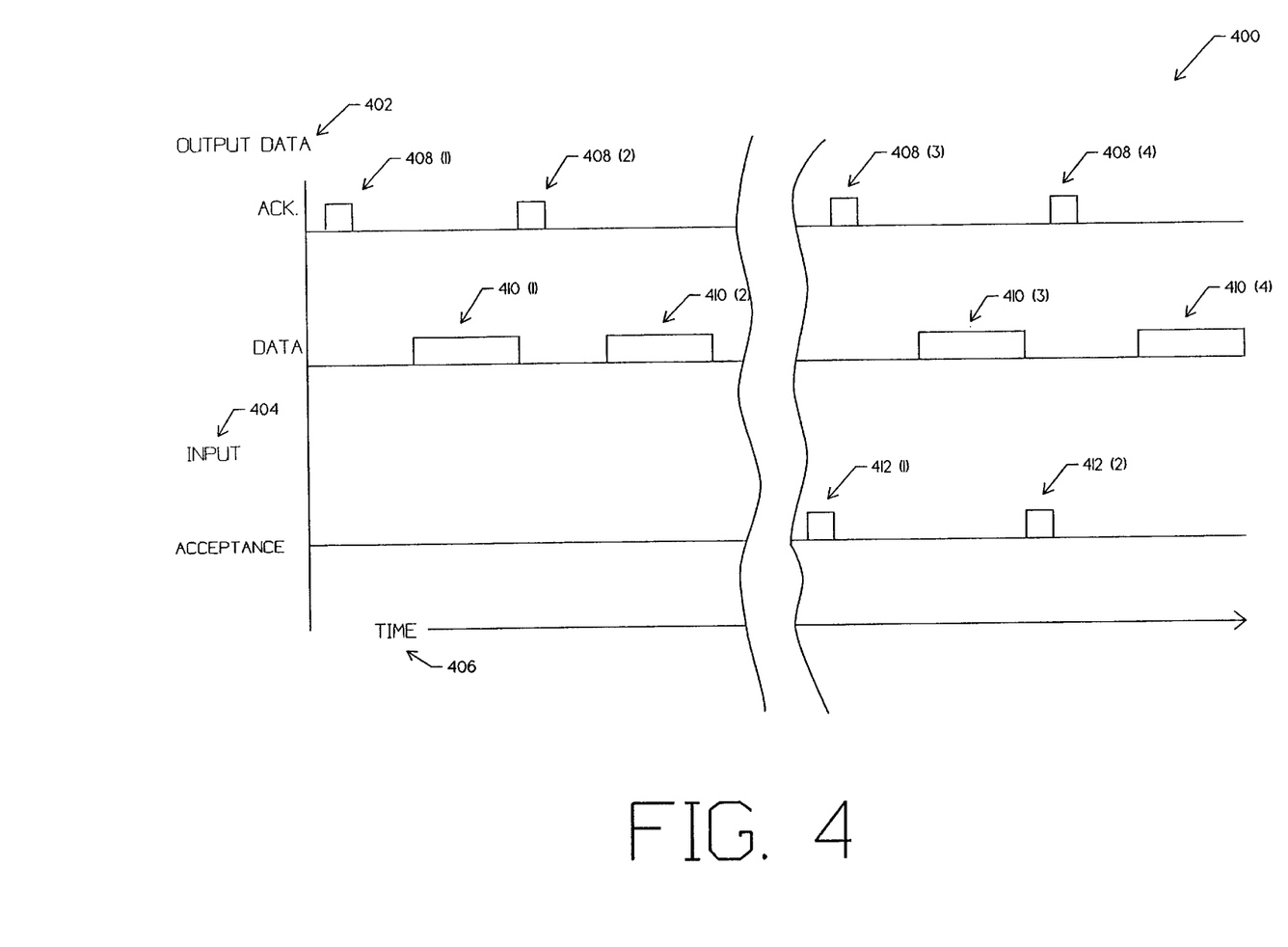
FIG. 4 shows a timing diagram of transmission and reception of the data and acknowledgement words.

The results 400 of the logic of FIG. 2 as described in FIGS. 3A and 3B on the transmission and reception of data is shown in FIG. 4. Output data 402 and input data 404 versus time 406 shows with the time sequence and offset of output acknowledge words 408, output data words 410 and acceptance signals 412. This illustrates the transmission of the first data sets where the first two acknowledgement words of the data sets 408 (1) and 408 (2) are transmitted with 410 (1) and 410 (2) following a fixed time interval later, with no further data sets being sent until acceptance signal 412 (1) is received, whereupon acknowledgement word 408 (3) followed by data word 410 (3) are then sent. After the return of acceptance signal 412 (2), acknowledgement word 408 (4) and data word 410 (4) are then sent. This arrangement minimizes the transfer time between cards while assuring that data is sent at an optimum rate.

This apparatus permits the use of a single communication channel in each direction between the cards of FIG. 1 to provide information from main memory banks to and from a cache memory. In this illustrative example HSI block 20 and 22 provide interchange between MSU 32 and 34, respectively, and SC 18 to FLC 16. HSI 20 and 22 also interface with HSI 24 and 26 over lines 64 and 66. HSI 24 and 26 in turn communicate with MSU 36 and 38 over lines 68 and 69, and 70 and 71, respectively. HSI 24 and 26 also communicate with HSI 28 and 30 over lines 72 and 74. HSI 28 and 30 communicate with MSU 40 and 42 over lines 76 and 77, and 78 and 79, respectively.

While only three cards 44, 46 and 48 are shown here, these interconnections can be extended. An additional card, similar to cards 46 and 48, can be provided and connected as extensions to card 48 in the same manner that card 48 is connected to 46. If desired, other cards can be connected to this additional card in the same manner.

This apparatus provides a means for communicating between memory elements over a single communication channel and affording equal access to remote and local cards in the process. The apparatus provides a single communication channel as a shared resource, with high speed interface apparatus as requesters for the shared resource. Different priorities assigned depending upon the past history of requests to optimize the channel usage and minimize transfer delay from a remote requester.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. In a computer apparatus having a shared resource and a plurality of requesters wherein the plurality of requesters are divided into a plurality of requester categories including a first requester category having one or more requestors and a second requestor category having one or more requesters, and wherein the plurality of requesters share the use of the shared resource and wherein each of said one or more requesters of said second requester category is physically located on a card external to and more remote from said shared resource than each of said one or more requesters of said first requester category whereby the circuit time delay attendant to a first desired request of said shared resource by each of said one or more requesters of said second requester category is greater than the corresponding circuit time delay attendant to a second desired request of said shared resource by each of said one or more requesters of said first requester category, wherein the improvement comprises:

priority controller means coupled to the plurality of requesters for selecting one of the plurality of requesters from the plurality of requesters desiring access to the shared resource according to a priority determination protocol which assigns a first pre-determined priority to requesters from the first requester category which is different than a second pre-determined priority assigned to the second requester category and wherein the difference between said first pre-determined priority and said second pre-determined priority compensates for the difference between said circuit time delay and said corresponding circuit time delay.

2. An improvement according to claim 1, wherein said priority controller means utilizes said priority determination protocol to alternatively grant pre-determined priorities to one of the one or more requesters in said first requester category and to one of the one or more requesters in said second requester category.

3. An improvement according to claim 2, wherein said priority controller means comprises a send acknowledge means coupled to the plurality of requesters for receiving a plurality of send acknowledgement signals from the plurality of requesters, wherein each of the plurality of send acknowledgement signals is asserted when a requester desires access to the shared resource; wherein one of said plurality of send acknowledgement signals corresponds to one of the plurality of requesters selected from said plurality of requesters desiring access to said shared resource.

4. An improvement according to claim 3, wherein said send acknowledgement means coupled to the one or more requesters in the second requester category comprises a send acknowledgement storage means for storing one or more send acknowledgement requests from the one or more requesters in the second requester category if one of the plurality of send acknowledgement signals corresponding to one of the plurality of requesters selected from the plurality of requesters desiring access is currently being output to said shared resource.

5. An improvement according to claim 4, wherein said priority controller means comprises a data means coupled to the plurality of requesters for receiving a plurality of data signals from the plurality of requesters; wherein one of the plurality of data signals corresponding to one of the plurality of requesters selected from the plurality of requesters desiring access is currently being output to said shared resource.

6. An improvement according to claim 5, wherein said data means coupled to the one or more requesters in the second requester category comprises a data storage means for storing one or more data from the one or more requesters in the second requester category if one of the plurality of data lines corresponding to one of the plurality of requesters selected from the plurality of requesters desiring access is currently being output to said shared resource.

7. An improvement according to claim 6, wherein said priority controller means comprises a read acknowledgement output means coupled to the one or more requesters in the second requester category for indicating to the one or more requesters in the second requester category that another one or more send acknowledgement requests and another one or more data can be sent.

8. An improvement according to claim 7, wherein said read acknowledgement output means indicates to the one or more requesters in the second requester category that a predetermined one or more send acknowledgement requests and predetermined one or more data can be sent.

9. An improvement according to claim 8, wherein said predetermined one or more send acknowledgement requests and said predetermined one or more data is determined from a data storage capacity of said data storage means and from a send acknowledgement request storage capacity of said send acknowledgement storage means.

10. An improvement according to claim 7, wherein said priority controller means comprises a read acknowledgement input means coupled to said shared resource for indicating that one of said plurality of send acknowledgement signals and that one of said plurality of data lines corresponding to one of the plurality of requesters selected from the plurality of requesters desiring access can be output to said shared resource.

11. An improvement according to claim 10, wherein the second requester category is comprised of a single requester.

12. An improvement according to claim 11, wherein priority is granted in a predetermined order to each particular one of the plurality of requesters in the first requester category.

13. An improvement according to claim 12, wherein said send acknowledgement storage means comprises a First-In-First-Out memory.

14. An improvement according to claim 13, wherein said data storage means comprises a First-In-First-Out memory.

15. An apparatus having a shared resource comprising:
 a. a plurality of requesters wherein the plurality of requesters are divided into a plurality of requester categories, including a first requester category having one or more requesters and a second requestor category having one or more requestors, and share the use of the shared resource wherein each of said one or more requestors of said second requestor category is physically located on a card external to and more remote from said shared resource than each of said one or more requestors of said first requestor category whereby the circuit time delay attendant to a first desired request of said shared resource by each of said one or more requesters of said second requester category is greater than the corresponding circuit time delay attendant to a second desired request of said shared resource by each of said one or more requesters of said first requester category; and
 b. priority controller means coupled to said plurality of requesters for selecting one of the plurality of requesters from a plurality of requesters desiring access to the shared resource according to a priority determination protocol which assigns a first pre-determined priority to requesters from the first requestor category which is different than the second pre-determined priority assigned to the second requestor category wherein the difference between said first pre-determined priority and said second pre-determined priority compensates for the difference between said circuit time delay and said corresponding circuit time delay.

16. An apparatus according to claim 15, wherein said priority controller means utilize said priority determination protocol to alternatively grant predetermined priorities to one of said one or more requesters in said first requester category and to one of said one or more requesters in said second requester category.

17. An apparatus according to claim 16, wherein said priority controller means comprises a send acknowledge means coupled to said plurality of requesters for receiving a plurality of send acknowledgement signals from said plurality of requesters; each of said plurality of send acknowledgement signals is asserted when a requester desires access to the shared resource; wherein one of said plurality of send acknowledgement lines corresponds to one of said plurality of requesters selected from said plurality of requesters desiring access to the shared resource.

18. An apparatus according to claim 17, wherein said send acknowledgement means coupled to said one or more requesters in said second requester category comprises a send acknowledgement storage means for storing one or more send acknowledgement requests from said one or more requesters in said second requester category if one of said plurality of send acknowledgement signals corresponding to said one of said plurality of requesters selected from said plurality of requesters desiring access is currently being output to the shared resource.

19. An apparatus according to claim 18, wherein said priority controller means comprises a data means coupled to said plurality of requesters for receiving a plurality of data signals from said plurality of requesters; wherein one of said plurality of data signals corresponding to one of said plurality of requesters selected from said plurality of requesters desiring access is currently being output to the shared resource.

20. An apparatus according to claim 19, wherein said data means coupled to said one or more requesters in said second requester category comprises a data storage means for storing one or more data from said one or more requesters in said second requester category if one of said plurality of data lines corresponding to one of said plurality of requesters selected from said plurality of requesters desiring access is currently being output to the shared resource.

21. An apparatus according to claim 20, wherein said priority controller means comprises a read acknowledgement output means coupled to said one or more requesters in said second requester category for indicating to said one or more requesters in said second requester category that another one or more send acknowledgement requests and another one or more data can be sent.

22. An apparatus according to claim 21, wherein said read acknowledgement output means indicates to said one or more requesters in said second requester category that a predetermined one or more send acknowledgement requests and a predetermined one or more data can be sent.

23. An apparatus according to claim 22, wherein said predetermined one or more send acknowledgement requests and said predetermined one or more data is determined from a data storage capacity of said data storage means and from a send acknowledgement request storage capacity of said send acknowledgement storage means.

24. An apparatus according to claim 21, wherein said priority controller means comprises a read acknowledgement input means coupled to the shared resource for indicating that one of said plurality of send acknowledgement signals and that one of said plurality of data lines corresponding to one of said plurality of requesters selected from said plurality of requesters desiring access can be output to the shared resource.

25. An apparatus according to claim 24, wherein said second requester category is comprised of a single requester.

26. An apparatus according to claim 25, wherein priority is granted in a predetermined order to each one of said plurality of requesters in said first requester category.

27. An apparatus according to claim 26, wherein said send acknowledge storage means comprises a First-In-First-Out memory.

28. An apparatus according to claim 27, wherein said data storage means comprises a First-In-First-Out memory.

29. A method of selecting a requester from a plurality of requesters desiring access to a shared resource, wherein the plurality of requesters are divided into a plurality of requester categories, including a first requester category having one or more requesters and a second requester category having one or more requesters, and wherein the plurality of requesters share the use of the shared resource, and wherein each of said one or more requesters of said second requester category is physically located on a card external to and more remote from said shared resource than each of said one or more requesters of said first requester category whereby the circuit time delay attendant to a first desired request of said shared resource by each of said one or more requesters of said second requester category is greater than the corresponding circuit time delay attendant to a second desired request of said shared resource by each of said one or more requesters of said first requester category, comprising:

a. selecting one of the plurality of requesters from the plurality of requesters desiring access to the shared resource according to a priority determination protocol which assigns a first pre-determined priority to requesters from the first requester category which is different than a second pre-determined priority assigned to the second requester category whereby the difference between said first pre-determined priority and said second pre-determined priority compensates for the difference between said circuit time delay and said corresponding circuit time delay.

30. A method of selecting a requester from a plurality of requesters desiring access to a shared resource, wherein the plurality of requesters are divided into a plurality of requester categories, and wherein the plurality of requesters share the use of the shared resource, comprising:

a. providing a priority determination protocol to assign a priority to requesters from a particular one of a plurality of requester categories which is different than the priority assigned to requesters from another particular one of a plurality of requester categories;

b. receiving one or more send acknowledgement signals from the plurality of requesters;

c. receiving one or more data signals from the plurality of requesters;

d. determining if another particular one of the plurality of requesters is currently being output to the shared resource;

e. outputting the send acknowledgement and data signal to the shared resource if only one send acknowledgement signal was received;

f. selecting a particular one of the plurality of requesters from the plurality of requesters desiring access to the shared resource according to the priority determination protocol if more than one send acknowledgement was received;

g. outputting the send acknowledgement signal and data signal corresponding to the selected particular one of the plurality of requesters to the shared resource; and h. repeating steps (b)–(g) until the send acknowledgement signal and data signal corresponding to each particular one of the plurality of requesters desiring access to the shared resource have been output to the shared resource.

31. A method of selecting a requester from a plurality of requesters desiring access to a shared resource, wherein the plurality of requesters are divided into two requester categories, and wherein the plurality of requesters share the use of the shared resource, comprising:

a. providing a priority determination protocol to alternatively grant priority to a particular one of the one or more requesters in the first requester category and to a particular one of the one or more requesters in the second requester category;

b. receiving one or more send acknowledgement signals from the plurality of requesters;

c. receiving one or more data signals from the plurality of requesters;

d. determining if another particular one of the plurality of requesters is currently being output to the shared resource;

e. outputting the send acknowledgement and data signal to the shared resource if not other particular one of the one or more send acknowledgement lines or data lines is currently being output to the shared resource;

f. storing the one or more send acknowledgement signals from the one or more requesters in the second requester category if another particular one of the plurality of send acknowledgement lines is currently being output to the shared resource;

g. storing the one or more data signals from the one or more requesters in the second requester category if another particular one of the plurality of data lines is currently being output to the shared resource;

h. selecting a particular one of the plurality of requesters from the plurality of requesters desiring access to the shared resource according to the priority determination protocol if more than one send acknowledgement was received;

i. receiving a read acknowledgement input to indicate whether the send acknowledgement signal and data signal corresponding to the selected particular one of the plurality of requesters can be output to the shared resource if the selected particular one of the plurality of requesters selected is from the second requester category;

j. outputting the send acknowledgement signal and data signal corresponding to the selected particular one of the plurality of requesters to the shared resource if the selected particular one of the plurality of requesters is from the first requester category or if step (i) indicates that the send acknowledgement signal and data signal corresponding to the selected particular one of the plurality of requesters from the second requester category can be output to the shared resource; and k. repeating steps (b)–(j) until the send acknowledgement signal and data signal corresponding to each particular one of the plurality of requesters desiring access to the shared resource have been output to the shared resource.

* * * * *

UNITED STATES PATENT AND TRADEMARK OFFICE
CERTIFICATE OF CORRECTION

PATENT NO.   : 5,970,253
DATED        : October 19, 1999
INVENTOR(S)  : David M. Purdham It is certified that error appears in the above-identified patent and that said Letters Patent is hereby corrected as shown below:

Column 10,
Line 52, thereof, delete "said" and insert therefor, -- the --.

Column 12,
Line 54, thereof, delete thereof "a".

Column 13,
Line 5, thereof, delete "said" and insert therefor, -- the --.

Signed and Sealed this

Ninth Day of July, 2002

Attest:

JAMES E. ROGAN
Attesting Officer    Director of the United States Patent and Trademark Office